(12) United States Patent
Rothery et al.

(10) Patent No.: US 8,699,061 B2
(45) Date of Patent: Apr. 15, 2014

(54) CONTROL PANEL SYSTEM

(75) Inventors: Joseph Rothery, San Diego, CA (US);
Ronald J Kaplan, San Diego, CA (US);
Lawrence J Gutkowski, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 307 days.

(21) Appl. No.: 12/973,817

(22) Filed: Dec. 20, 2010

(65) Prior Publication Data

US 2012/0154851 A1 Jun. 21, 2012

(51) Int. Cl.
*G06F 3/12* (2006.01)

(52) U.S. Cl.
USPC ........ 358/1.15; 358/1.14; 358/1.13; 345/156; 345/173; 345/168; 345/169; 710/73; 710/303; 347/108; 347/109

(58) Field of Classification Search
CPC ... G06F 1/1632; G06F 1/1607; G06F 1/1698; G06F 1/1696; G06F 3/04886; G06F 3/041; G06F 3/12; G06F 3/1201
USPC ............... 358/1.15, 1.14, 1.13; 345/156, 173, 345/168, 169; 710/73, 303; 347/108, 109
See application file for complete search history.

(56) References Cited

U.S. PATENT DOCUMENTS

| | | | |
|---|---|---|---|
| 5,513,922 A * | 5/1996 | Umbach | 400/691 |
| 6,247,085 B1 | 6/2001 | Youngers | |
| 2003/0038880 A1* | 2/2003 | No | 348/207.1 |
| 2003/0202013 A1* | 10/2003 | Wilkinson et al. | 345/762 |
| 2004/0140986 A1* | 7/2004 | Boldon | 345/700 |
| 2004/0150803 A1* | 8/2004 | Boldon | 355/18 |
| 2004/0201774 A1* | 10/2004 | Gennetten | 348/375 |
| 2006/0066753 A1* | 3/2006 | Gennetten et al. | 348/375 |

* cited by examiner

*Primary Examiner* — Jacky X Zheng
(74) *Attorney, Agent, or Firm* — Steven R. Ormiston

(57) ABSTRACT

In one example, a control panel system for a printer includes a portable control panel configured to receive user input to control printer functions and a stationary control panel configured to receive user input to control printer functions. In this example, the portable control panel has a wireless connector for making a wireless connection to the printer. In another example, a control panel system for a device (for example a printer) includes: a portable control panel; a stationary control touch panel; a dock configured to receive the portable control panel; and a feature configured to inhibit the portable control panel from triggering touch sensitive buttons on the stationary control panel during docking and undocking. In this example, the stationary control touch panel is hidden from view by the portable control panel and inaccessible to the user when the portable control panel is docked.

20 Claims, 9 Drawing Sheets

CONTROL PANEL SYSTEM

BACKGROUND

The functionality of multi-function printers is expanding to include mobile printing and wireless Web browsing.

BRIEF DESCRIPTION OF THE DRAWINGS

The same numbers are used throughout the figures to designate the same or similar parts.

DESCRIPTION

Examples of a new user control panel system are shown in the figures and described below. The new control panel system was developed to help enhance the user experience for a new class of multi-function printers that combine a wireless Web browsing experience with traditional printing and scanning functions. Hence, examples of the new system will be described with reference to a printer. The new control panel system, however, is not limited to use with printers. The examples described below do not limit the scope of the invention, which is defined in the claims that follow this Description.

Figure 1:
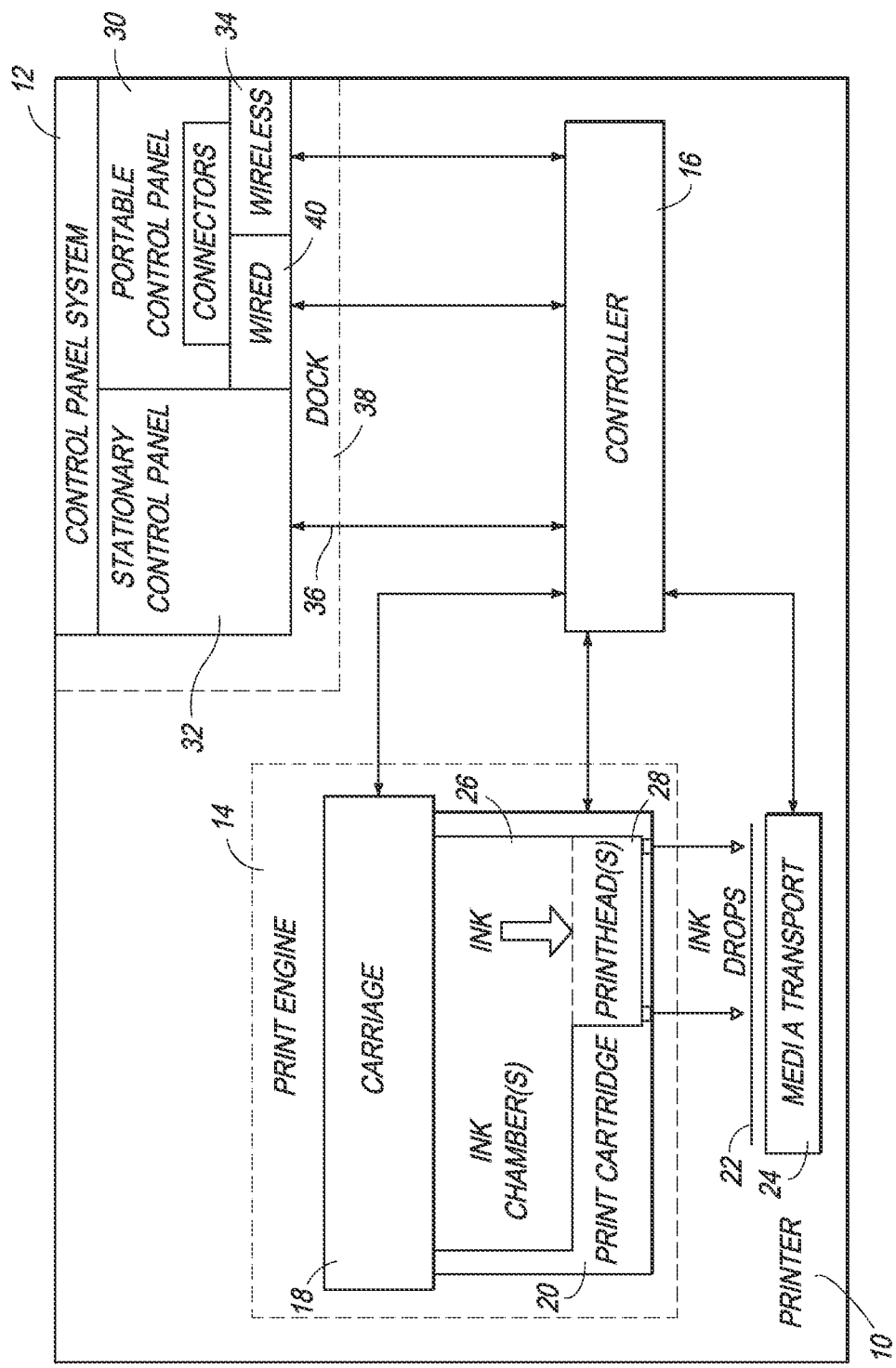
FIG. 1 is a block diagram illustrating an inkjet printer that includes a control panel system according to one example of the invention.

FIG. 1 is a block diagram illustrating an inkjet printer 10 that includes a control panel system 12 according to one example of the invention. Referring to FIG. 1, printer 10 includes control panel system 12, a print engine 14, and a printer controller 16. As used in this document: a "controller" means a component or group of components, typically including a processor and associated memory and programming, used to communicate with and control operative elements of the printer; and a "print engine" means a component or group of components used to apply ink, toner or other imaging material to print media. In inkjet printer 10, for example, print engine 14 includes a scanning carriage 18 carrying one or more print cartridges 20 over paper or other print media 22. Media 22 is advanced past cartridges 20 at the urging of a print media transport 24. Each print cartridge 20 typically will include one or more ink holding chambers 26 and one or more printheads 28. A print cartridge is also commonly referred to as an ink pen or an ink cartridge. By coordinating the relative position of cartridge(s) 20 with media 22 and the ejection of ink drops from printheads 28, controller 16 produces the desired image on media 22.

Printer control panel system 12 includes a portable user control panel 30 and a stationary user control panel 32. A "stationary" control panel as used in this document means the control panel is stationary with respect to the printer, even though the printer itself may be movable. Each control panel 30 and 32 is configured to control printer functions by communicating user input to controller 16. In addition, portable control panel 30 might also be configured as a wireless tablet computer or other portable computing or communications device enabling, for example, a full Web browsing experience as well as printer control functions. As described below with reference to the example shown in FIGS. 2-4, portable control panel 30 may include a more comprehensive range of printer control functions combined with Web browsing functionality, while stationary control panel 32 may include more basic printer control functions available to the user at the printer if portable control panel 30 is not available or if the user chooses to not use portable control panel 30 to control printer 10.

Portable control panel 30 includes a wireless connector 34 for making a wireless connection to printer controller 16. Wireless connector 34 represents generally any suitable wireless device enabling wireless communication with controller 16. Portable control panel 30 may connect directly to controller 16 or indirectly through a wireless intermediary, such as a router or the Internet. Stationary control panel 32 is operatively connected to printer controller 16 through a wired or wireless connection 36. Printer 10 may include a dock 38 for docking portable control panel 30. Accordingly, portable control panel 30 may also include a wired connector 40 for making a wired connection to controller 16 and/or for making a wired connection to a battery charging device (not shown) when portable control panel 30 is docked at dock 38.

Figure 2:
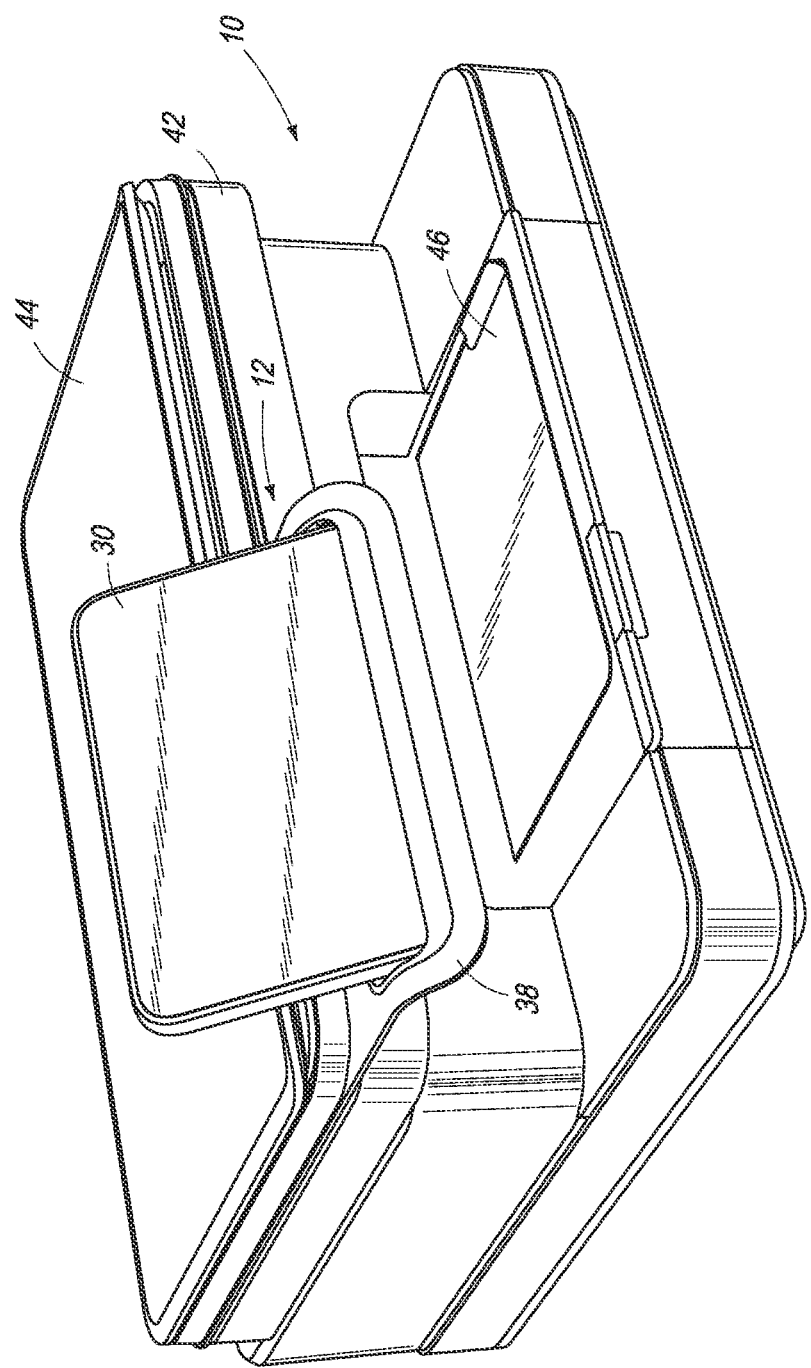
FIGS. 2 and 3 are perspective and side views, respectively, of a printer that includes a control panel system according to one example of the invention, with the portable control panel docked.
Figure 3:
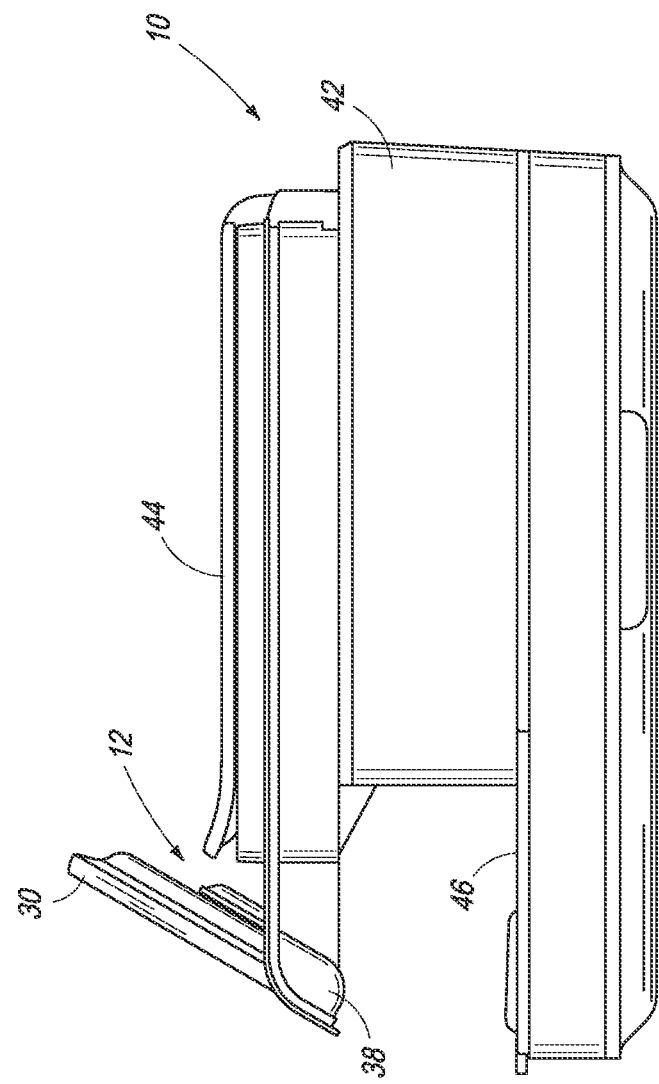
Figure 4:
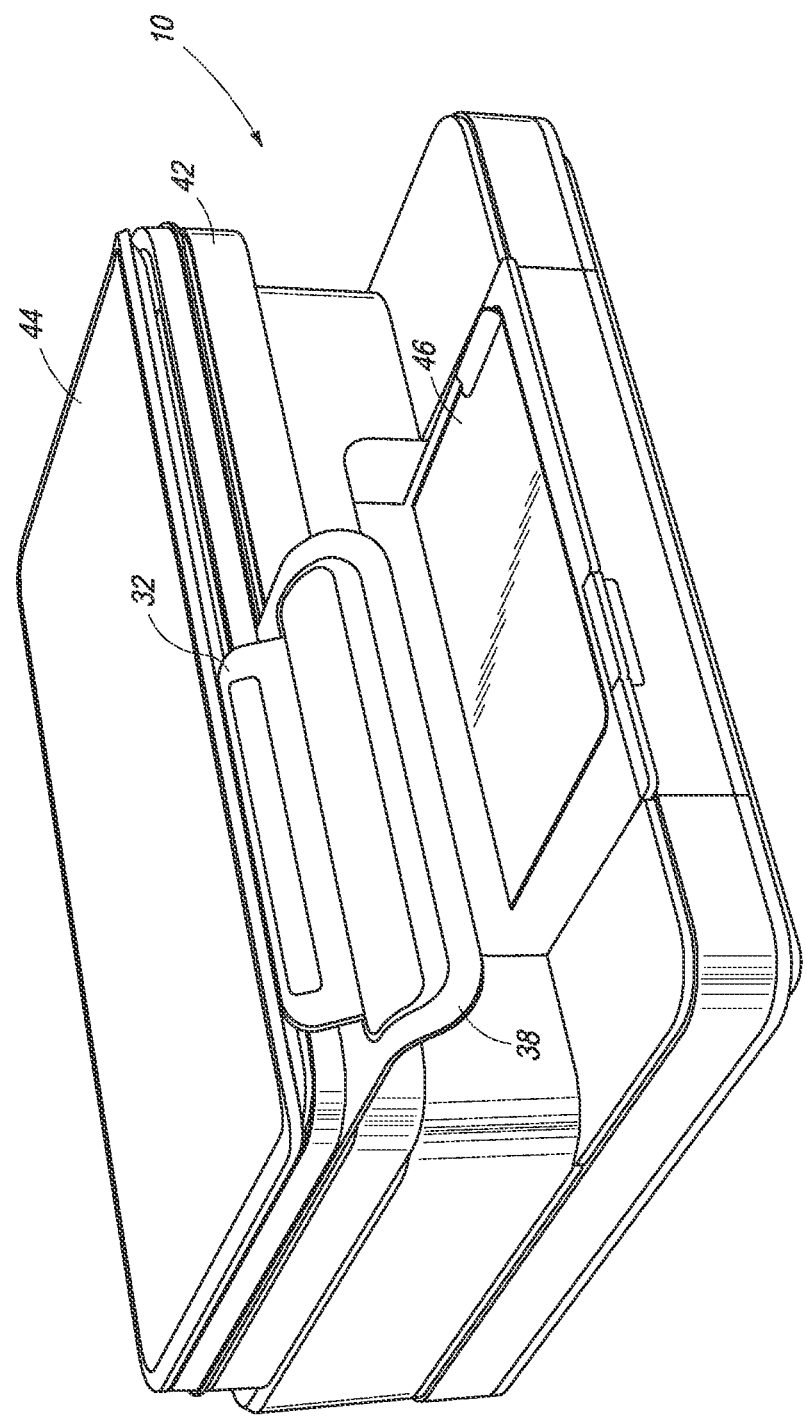
FIG. 4 is a perspective view of the printer shown in FIGS. 2 and 3 with the portable control panel undocked, exposing the stationary control panel.

FIGS. 2-4 illustrate a multi-function printer 10 that includes a control panel system 12 according to one example of the invention. In FIGS. 2 and 3, a portable control panel 30 in system 12 is docked at printer 10, hiding a stationary control panel 32. In FIG. 4, portable control panel 30 is undocked to expose stationary control panel 32 in system 12. Referring to FIGS. 2-4, operative components of printer 10, such as print engine 14, controller 16 and media transport 24 in FIG. 1, are housed in a housing 42. Control panel dock 38 is integrated into or otherwise affixed to printer housing 42. Stationary control panel 32 is integrated into or otherwise affixed to dock 38. Other features of printer 10 visible in FIGS. 2-4 include flat bed scanner lid 44 and paper tray 46.

Figure 5:
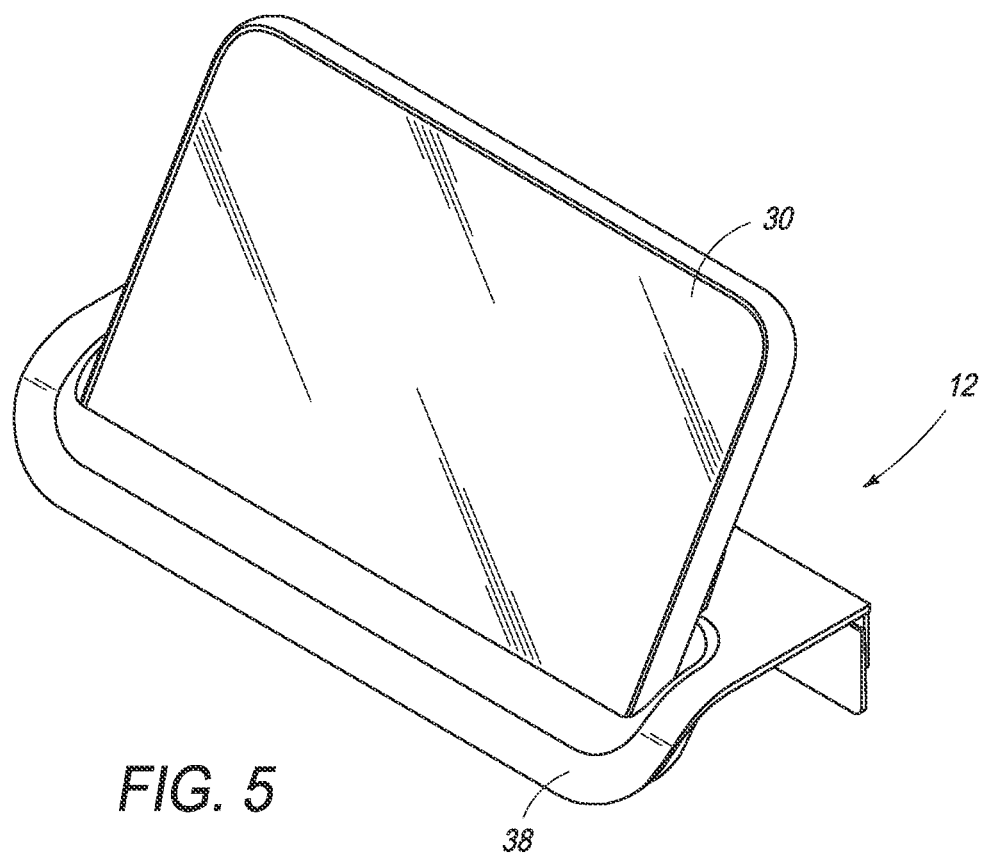
FIGS. 5 and 6 are close-up perspective views of the control panel system and dock in the printer of FIGS. 2-4. The portable control panel is docked in FIG. 5 and undocked in FIG. 6.
Figure 6:
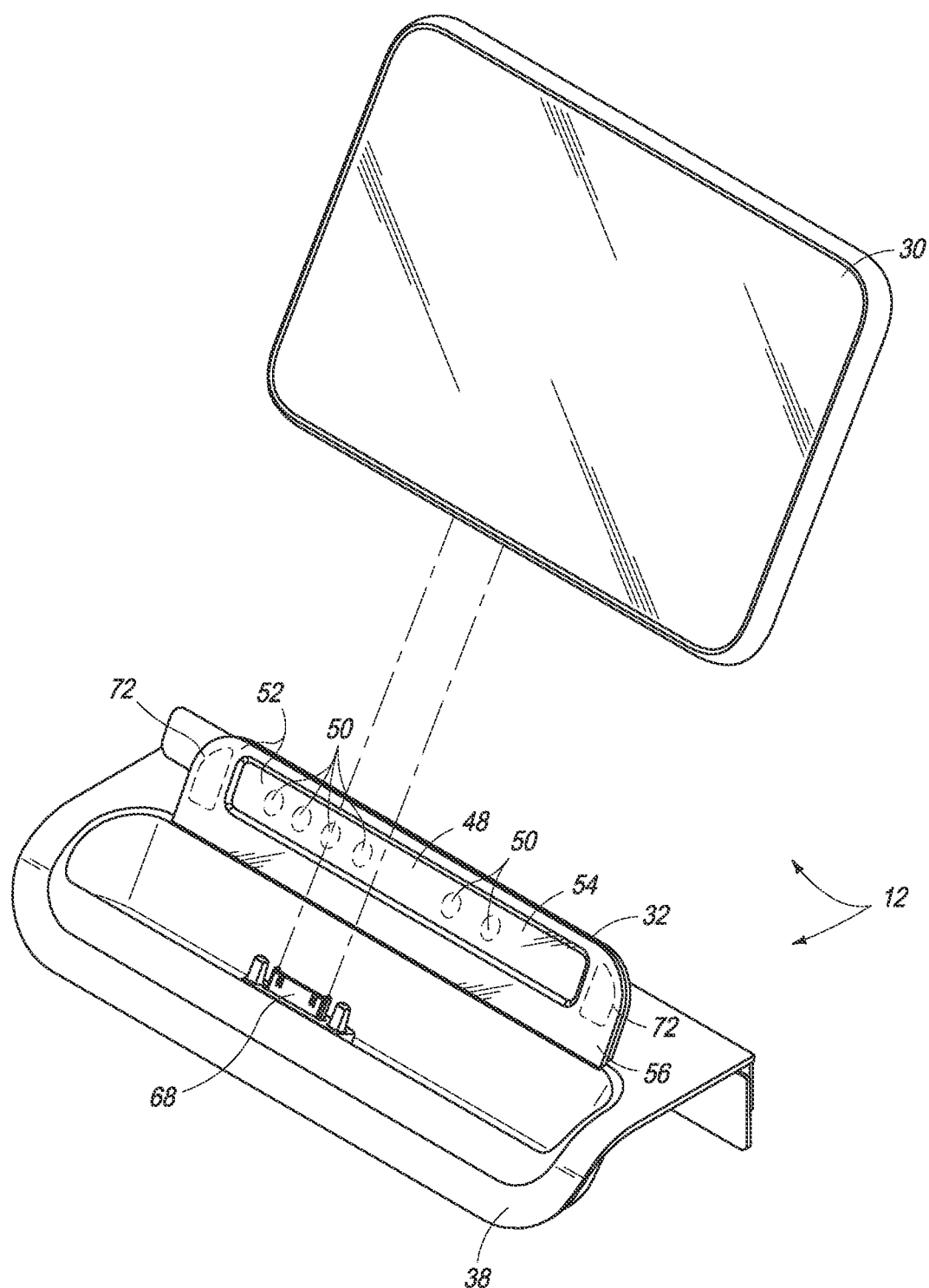
Figure 7:
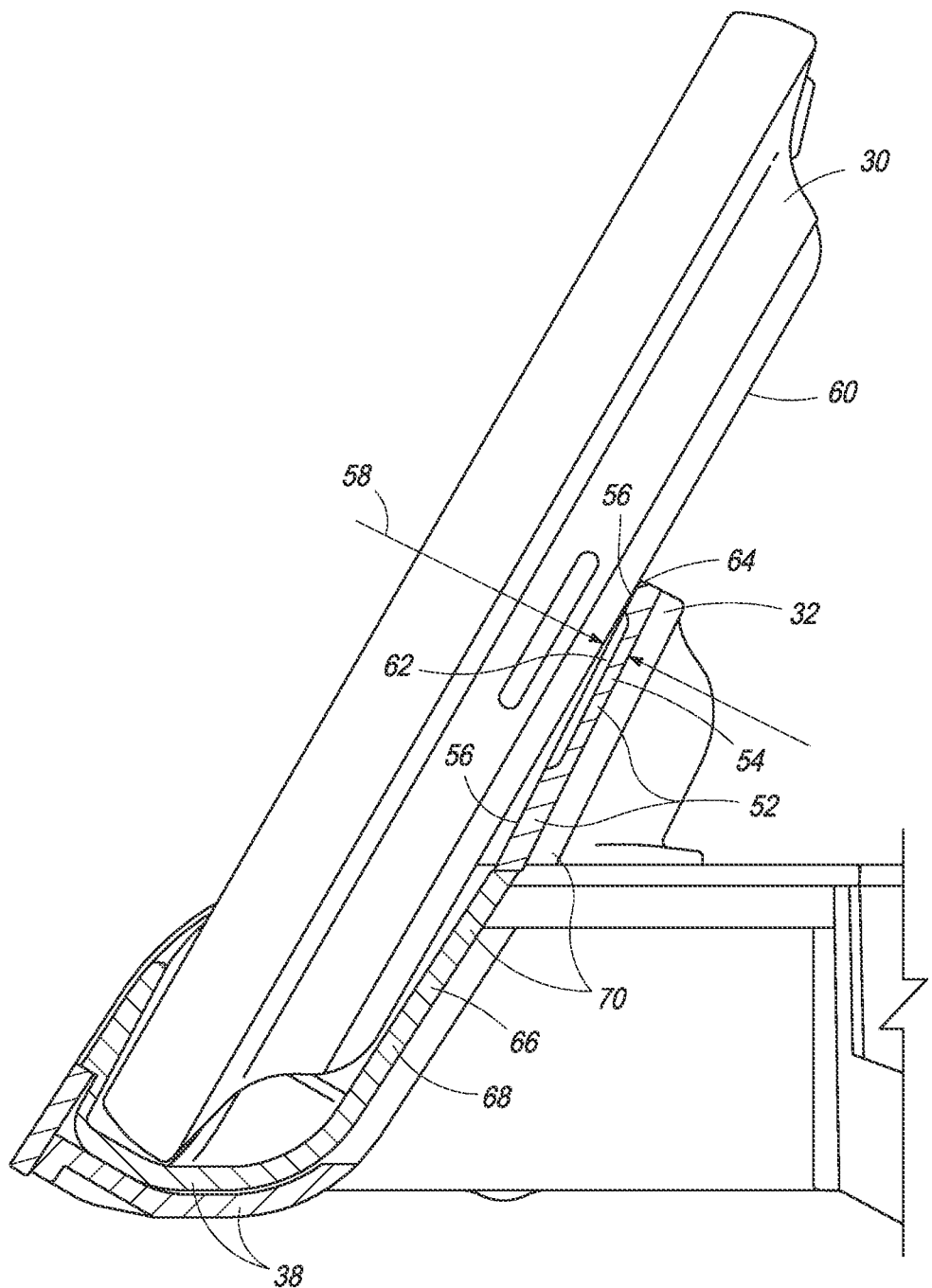
FIG. 7 is a close-up partial section view showing the position of the portable and stationary control panels when the portable control panel is docked in the printer of FIG. 2-4.

FIGS. 5 and 6 are close-up perspective views of control panel system 12 and dock 38 from printer 10 shown in FIGS. 2-4. Portable control panel 30 is docked in FIG. 5 and undocked in FIG. 6. FIG. 7 is a close-up partial section view showing the position of portable control panel 30 and stationary control panel 32 when portable control panel 30 is docked. Referring now also to FIGS. 5-7, stationary control panel 32 is hidden from view and inaccessible to the user when portable control panel 30 is docked, as best seen in FIGS. 2, 3, and 5. Stationary control panel 32 is exposed and accessible to the user when portable control panel 30 is undocked, as best seen in FIGS. 4 and 6. In the example shown, stationary control panel 32 includes a touch screen 48 to receive user input. A touch screen is also commonly referred to as a touch panel. As shown in FIG. 6, stationary control panel 32 includes a set of visible buttons 50 for activating basic print, copy and scan functions.

Each button 50 represents, for example, an individual capacitive touch sensor corresponding to a function that is initiated, disabled, or discontinued etc. when that area is touched. Other configurations for buttons 50 are possible. For example, each button 50 may represent a grid location on a larger touch sensitive area that encompasses all of the buttons 50. The function corresponding to each button 50 may be depicted in any suitable manner, for example by artwork, lighting, geometry, or a dynamic electronic display. (Alternatively, the function may not be depicted at all, as in the case of the "invisible" guard buttons described below.) Where each button 50 is configured as an individual capacitive touch sensor, then it may be desirable to cover buttons 50 with a protective lens 52. Lens 52 may be transparent or opaque (or transparent in some parts and opaque in other parts), for example depending on the function indicators used for buttons 50. A user triggers the desired printer function by touching screen 48 at the location of the corresponding button 50.

Hiding stationary control panel 32 behind the docked portable control panel 30 minimizes the risk of user confusion otherwise present when the two control panels 30, 32 are accessible at the same time. Hiding stationary control panel 32 behind the docked portable control panel 30 also presents a more visually appealing design to the user. However, where, for example, a capacitive touch screen 48 is used, touch sensitive buttons 50 must be protected to reduce the risk that portable control panel 32 will trigger buttons 50. As noted below with reference to FIGS. 8 and 9, buttons 50 may be disabled electrically (turned off) when portable control panel 30 is docked. Thus, the risk of false triggers is greatest during docking and undocking portable control panel 30.

In the example shown in FIGS. 6 and 7, lens 52 is recessed in the area encompassing buttons 50. The recessed part 54 of lens 52 is surrounded by a raised outer lens face 56 that helps to physically isolate buttons 50 from portable control panel 30 during docking and undocking. In addition, the resulting gap 58 in the recessed area reduces the sensitivity of capacitive touch buttons 50 to the presence of portable control panel 30 in dock 38. Gap 58 includes the thickness of lens 52 (at recessed part 54) and an air space 62. The low dielectric constant of the air in space 62 helps enable the use of a non-conducting lens material with a higher dielectric constant that acts as an electro-static discharge barrier to buttons 50 without materially desensitizing buttons 50 to user touch. Thus, the composite nature of gap 58 has the desirable effect of desensitizing buttons 50 to the presence of control panel 30 without also desensitizing buttons 50 to user touch.

Furthermore, as shown in FIG. 7, the raised outer lens face 56 is angled down and away from an upper abutment 64 (on lens face 56) and the adjacent back side 66 of dock 38 is angled up and away from a lower abutment 68 (on dock back side 66). The resulting V shaped structure 70 protects lens recess 54 and buttons 50 from portable control panel 30 during docking and undocking. Although the protective features surrounding buttons 50 are formed by lens 52 in the example shown, other configurations are possible. For example, where a lens is not necessary or desirable, such as might be the case for other types of touch panels, these protective features may be formed in a housing or other structure surrounding buttons 50.

The protective features described above inhibit portable control panel 30 from triggering buttons 50 by physically isolating buttons 50 from portable control panel 30 and by reducing the sensitivity of capacitive touch buttons 50 to the presence of portable control panel 30, thus reducing the risk of false triggers from portable control panel 30. Gap 58 is configured to reduce the risk of false triggers while still maintaining a desired level of access and responsiveness to user touch. For example, it has been observed that a polycarbonate lens 52 having a nominal thickness at gap 58 of about 1.3 mm and an air space 62 of about 1.0 mm (total gap 58 of about 2.3 mm) reduces the risk of false triggers to an acceptable level while maintaining an acceptable level of access and responsiveness to user touch.

In the example shown, an additional protective feature is used to further reduce the risk of false triggers while docking and undocking portable control panel 30. Referring again specifically to FIG. 6, stationary control panel 32 also includes a pair of invisible "guard" buttons 72 for disabling printer function buttons 50 while docking and undocking portable control panel 30. Guard buttons 72 are positioned under lens face 56 at upper abutment area 64 (FIG. 7) on either side of recess 54 so that portable control panel 30 will trigger guard buttons 72, disabling buttons 50, if panel 30 comes into contact with upper abutment area 64 on stationary control panel 32. In one example, control panel 32 is configured to disable buttons 50 if either guard button 72 is triggered. In another example, control panel 32 is configured to disable buttons 50 only if both guard buttons 72 are triggered simultaneously within a specified time period (which could be zero), to reduce the risk of a user disabling buttons 50 by inadvertently touching one of the guard buttons 72.

Figure 8:
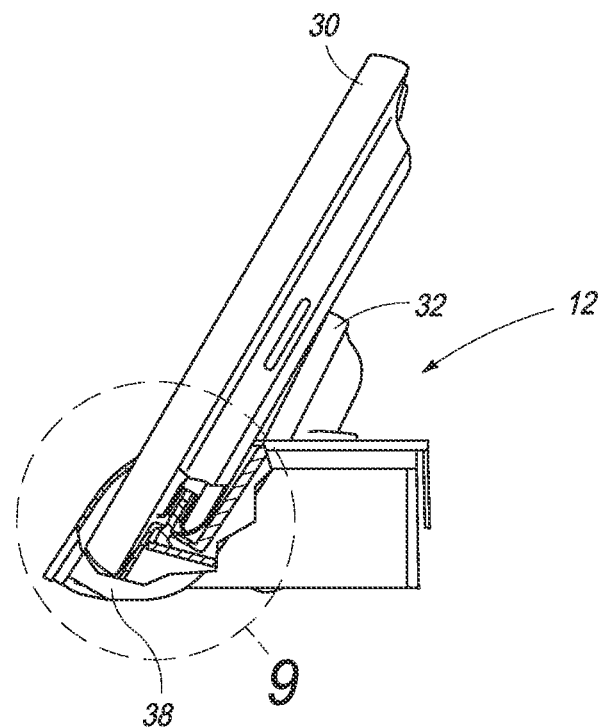
FIG. 8 is partial section view showing the connection between the portable control panel and the dock in the printer of FIGS. 2-4.
Figure 9:
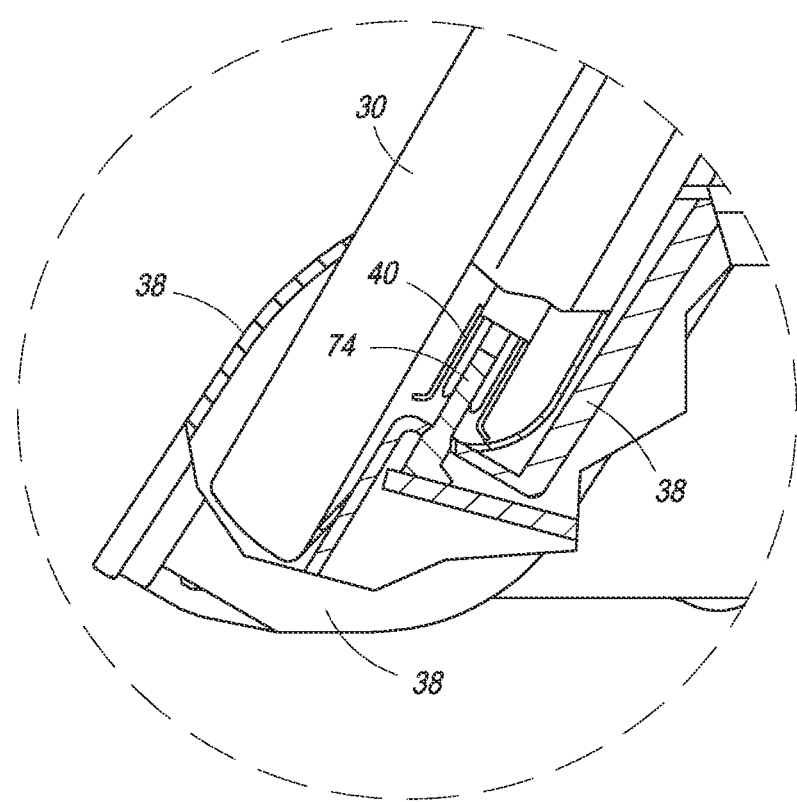
FIG. 9 is a close-up view from FIG. 8 showing the connection between the portable control panel and the dock in more detail.

Referring now also to FIGS. 8 and 9, dock 38 includes a wired connector 74 that connects to wired connector 40 on portable control panel 30 when control panel 30 is docked. Connectors 40 and 74 make a wired connection to, for example, controller 16 (FIG. 1) and/or a battery charging device (not shown). In one example, making the wired connection to portable control panel 30 in dock 38 disables printer function buttons 50, and guard buttons 72 too if desired, on stationary control panel 32. This mechanism for disabling stationary control panel 32 essentially eliminates any possibility that portable control panel 30 will trigger any of buttons 50 while docked.

As noted at the beginning of this Description, the examples shown in the figures and described above illustrate but do not limit the invention. Therefore, the foregoing description should not be construed to limit the scope of the invention, which is defined in the following claims.

What is claimed is:

1. A control panel system for a printer, comprising:
    a portable control panel configured to receive user input to control printer functions, the portable control panel having a wireless connector for making a wireless connection to the printer;
    a stationary control panel configured to receive user input to control printer functions;
    a dock for holding the portable control panel; and
    one or more of:
        the stationary control panel inaccessible to a user when the portable control panel is docked and the stationary control panel accessible to a user when the portable control panel is not docked;
        the stationary control panel hidden from view by the portable control panel when the portable control panel is docked and the stationary control panel exposed to view when the portable control panel is not docked; and
        the stationary control panel disabled from receiving user input to control printer functions when the portable control panel is docked.

2. The system of claim 1, wherein the stationary control panel is inaccessible to a user when the portable control panel is docked and the stationary control panel is accessible to a user when the portable control panel is not docked.

3. The system of claim 1, wherein the stationary control panel is hidden from view by the portable control panel when the portable control panel is docked and the stationary control panel is exposed to view when the portable control panel is not docked.

4. The system of claim 1, wherein the stationary control panel is disabled from receiving user input to control printer functions when the portable control panel is docked.

5. The system of claim 1, wherein the stationary control panel is hidden from view by the portable control panel and inaccessible to a user when the portable control panel is docked and the stationary control panel is exposed to view and accessible to a user when the portable control panel is not docked.

6. The system of claim 5, wherein the stationary control panel is disabled from receiving user input to control printer functions when the portable control panel is docked.

7. The system of claim 1, wherein the portable control panel includes a wired connector and the dock is configured to electrically connect to the portable control panel wired connector.

8. A control panel system for a device, comprising:
a portable control panel configured to receiver user input to control device functions, the portable control panel having a wired connector for making a wired connection to the device and a wireless connector for making a wireless connection to the device;
a stationary control touch panel having touch sensitive first buttons for receiving user input to control device functions;
a dock configured to receive the portable control panel and to electrically connect to the portable control panel wired connector, the stationary control touch panel hidden from view by the portable control panel and inaccessible to a user when the portable control panel is docked and the stationary control touch panel exposed to view and accessible to a user when the portable control panel is not docked; and
a feature configured to inhibit the portable control panel from triggering the touch sensitive first buttons during docking and undocking.

9. The system of claim 8, wherein the feature configured to inhibit the portable control panel from triggering the touch sensitive first buttons during docking and undocking comprises a feature configured to physically isolate the touch sensitive first buttons from the portable control panel and to reduce the sensitivity of the touch sensitive first buttons to the presence of the portable control panel.

10. The system of claim 9, wherein the feature configured to physically isolate the touch sensitive first buttons from the portable control panel and to reduce the sensitivity of the touch sensitive first buttons to the presence of the portable control panel comprises the touch sensitive first buttons recessed into a face of the stationary control panel, the face to abut the portable control panel during docking and undocking and the recess to allow an air space between the portable control panel and the touch sensitive first buttons.

11. The system of claim 10, further comprising a touch sensitive second button on the face of the stationary control panel, the touch sensitive second button configured to disable the touch sensitive first buttons if triggered by the portable control panel during docking and undocking.

12. The system of claim 11, wherein the touch sensitive second button comprises a pair of touch sensitive second buttons positioned opposite one another on either side of the recess.

13. The system of claim 10, further comprising an electrically non-conductive lens covering the touch sensitive first buttons, the lens defining the recess and the face.

14. The system of claim 9, further comprising an electrically non-conductive lens covering the touch sensitive first buttons and wherein the feature configured to physically isolate the touch sensitive first buttons from the portable control panel and to reduce the sensitivity of the touch sensitive first buttons to the presence of the portable control panel comprises a composite gap defined by a thickness of the lens and an air space between the lens and the portable control panel when the portable control panel is docked.

15. A printer, comprising:
a print engine;
a controller operatively connected to the print engine;
a portable control panel configured to receive user input to control printer functions, the portable control panel having a wireless connector for making a wireless connection to the controller;
a stationary control panel operatively connected to the controller and configured to receive user input to control printer functions; and
a dock configured to receive the portable control panel, the stationary control panel hidden from view by the portable control panel and inaccessible to a user when the portable control panel is docked and the stationary control panel exposed to view and accessible to a user when the portable control panel is not docked.

16. The printer of claim 15, wherein the stationary control panel is disabled when the portable control panel is docked.

17. The printer of claim 15, wherein the portable control panel includes a wired connector and the dock is further configured to electrically connect to the portable control panel wired connector.

18. The printer of claim 15, wherein:
the stationary control panel includes a touch panel for receiving user input to control printer functions; and
the touch panel is hidden from view by the portable control panel and inaccessible to the a user when the portable control panel is docked and the touch panel is exposed to view and accessible to a user when the portable control panel is not docked.

19. The printer of claim 15, wherein the stationary control panel includes:
a touch panel having touch sensitive buttons for receiving user input to control printer functions; and
a feature configured to inhibit the portable control panel from triggering the touch sensitive buttons during docking and undocking.

20. The printer of claim 15, wherein the feature configured to inhibit the portable control panel from triggering the touch sensitive buttons during docking and undocking comprises the touch sensitive buttons recessed into a face of the stationary control panel, the face to abut the portable control panel during docking and undocking and the recess to allow an air space between the portable control panel and the touch sensitive buttons.

* * * * *

UNITED STATES PATENT AND TRADEMARK OFFICE
CERTIFICATE OF CORRECTION

| | | |
|---|---|---|
| PATENT NO. | : 8,699,061 B2 | Page 1 of 1 |
| APPLICATION NO. | : 12/973817 | |
| DATED | : April 15, 2014 | |
| INVENTOR(S) | : Joseph Rothery et al. | |

It is certified that error appears in the above-identified patent and that said Letters Patent is hereby corrected as shown below:

In the Claims

In column 6, line 42, in Claim 18, delete "the a" and insert --a--, therefor.

Signed and Sealed this
Twenty-ninth Day of July, 2014

Michelle K. Lee
*Deputy Director of the United States Patent and Trademark Office*